United States Patent [19]

Lücke et al.

[11] Patent Number: 5,108,839
[45] Date of Patent: Apr. 28, 1992

[54] FIBER-REINFORCED THERMOPLASTIC COMPOSITE AND MOLDINGS PRODUCED THEREFROM

[75] Inventors: Andreas Lücke, Waldbrunn; Arnold Schneller, Mainz, both of Fed. Rep. of Germany

[73] Assignee: Hoechst Aktiengesellschaft, Frankfurt am Main, Fed. Rep. of Germany

[21] Appl. No.: 478,629

[22] Filed: Feb. 12, 1990

[30] Foreign Application Priority Data

Feb. 14, 1989 [DE] Fed. Rep. of Germany ....... 3904342

[51] Int. Cl.⁵ .................... B32B 27/04; B32B 27/12; B32B 27/28; B32B 27/42
[52] U.S. Cl. .................................. 428/408; 428/290; 428/902; 525/435; 528/126; 528/179; 528/193
[58] Field of Search ............ 428/408, 901, 902, 304.4; 528/179, 126, 193; 264/126; 521/134, 919

[56] References Cited

U.S. PATENT DOCUMENTS

| 3,956,240 | 5/1976 | Dahl et al. | 528/193 |
| 4,904,532 | 2/1990 | Staniland et al. | 428/408 |
| 4,912,176 | 3/1990 | Alvarez et al. | 525/435 |

*Primary Examiner*—George F. Lesmes
*Assistant Examiner*—Richard C. Weisberger

[57] ABSTRACT

Composites based on PEEKK and reinforcing fibers give moldings which have a high modulus of elasticity. The moldings have a higher rigidity and heat resistance in comparison with moldings produced from prior-art polyetherketones. The proportion of reinforcing fibers is 1 to 70% by weight. Composites of this type can be processed in standard injection molding machines.

9 Claims, No Drawings

FIBER-REINFORCED THERMOPLASTIC COMPOSITE AND MOLDINGS PRODUCED THEREFROM

The present invention relates to a fiber-reinforced thermoplastic composite composed of polyetheretherketoneketone as the matrix and glass fibers or carbon fibers as the reinforcement and to moldings produced from said composite.

Polyetherketones are a semi-crystalline matrix material having excellent heat resistance. Polymers of this type have glass transition temperatures of between 130° and 180° C. and melting points of between 330° and 400° C. The high heat resistance of these thermoplastics is due to their high thermal transition temperatures.

Polyetherketones have significant advantages compared with other high temperature polymers owing to their chemical and morphological structure.

For instance, compared with polyimides, which can attain still higher heat resistance, said polyetherketones have the significant advantage for the processor of easy processing as a thermoplastic.

In contrast with the amorphous high temperature polymers such as for example polyethersulfones or polyetherimides, the semi-crystalline polyetherketones have the advantage of greater resistance to solvent stress crazing and very good chemical resistance. Moreover, polyetherketones have good slip and abrasion properties which allows polyetherketones to be used for example in the automotive trade and mechanical engineering.

Composites employing polymers of this type are already known (DE-A-2,425,166, GB-B-1,387,303, U.S. Pat. No. 3,434,914, and EP-B-0,031,198). EP-B-0,031,198 points out the good heat distortion resistance or temperature (HDT) of the composites based on PEEK which are described there. The modulus of elasticity of this material is also described as being unusually high in comparison with the unreinforced material. Compositions based on PEEK are described, for example, in which the reinforcement with glass fibers brings about an increase in the HDT of PEEK of at least 3° C. per 1% addition of fiber reinforcement.

PEEK is the name given to a polyetherketone which is composed of repeating units of the formula

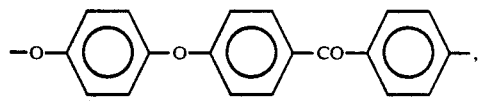
(I)

in which "E" represents the phenoxy radical

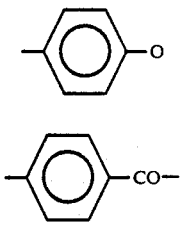

and "K" represents the phenylketo radical
This explains the nomenclature of the polyetherketones.

Despite this high level of given properties, the suitability of the material for certain purposes, for example in the engine compartment of automotive vehicles or in aerospace applications, is often insufficient.

There is therefore a need for a composite which can be processed as a thermoplastic and which meets the increased requirements. In particular, the novel composite must have a heat resistance greater than that of the hitherto commercially-available materials and also high toughness and very good melt stability. The object of the present invention is therefore to provide a composite which has a high level of thermal and mechanical properties, and in particular a high modulus of elasticity.

A further object of the invention is a molding which has high rigidity.

This object is achieved using a fiber-reinforced thermoplastic composite made from (A) a polyetherketone, and which is reinforced with (B) reinforcing fibers and optionally contains (C) other customary additives, where the polyetherketone is predominantly composed of repeating units of the formula

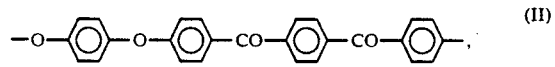
(II)

and also has a melt viscosity MFI(400° C./10 min)=2 to 250 g and an inherent viscosity of at least 0.5 and the composite contains 1 to 70% by weight, based on the sum of A) to C), of reinforcing fibers.

The polyetheretherketoneketone (PEEKK) which has been reinforced in this way with for example glass fibers or carbon fibers has a higher rigidity and strength at 20° C. and above than the reinforced polyetherketone PEEK having the repeating units of the formula (I) which has already been introduced to the market.

The PEEKK used in the composites according to the invention has inherent viscosities of at least 0.5, preferably 0.7 to 1.8, in particular 0.8 to 1.5, and molecular weights (number average) of 5,000 to 2,000,000 preferably of 10,000 to 1,000,000.

The heat resistance of polymers such as polyetherketones is determined to a significant extent by the ether/keto ratio. The rigid bonding angle of the keto groups brings about a stiffening of the polymer chain and consequently increases the heat resistance, while the rotationally mobile bonding angle of the ether groups introduces flexibility into the chain and consequently reduces the heat resistance. Moreover, increasing the proportion of the keto component also increases the melting point and consequently the processing temperature which is necessary for the particular polyetherketone. This means that increasing the heat resistance by increasing the proportion of keto groups or reducing the proportion of ether bridges has limited scope, since the standard injection molding machines in current use will only permit maximum processing temperatures of 400° C.

For instance, a para-substituted polyetherketone of the PEKK type (ether/keto ratio ½) is not processable on standard injection molding machines since its processing temperature is not attained by these injection molding machines. Although a polyetherketone of the PEKEKK type (ether/keto ratio ⅔) has better processability, this is still not optimal.

In contrast, the optimal matrix material for preparing fiber-reinforced composites and moldings is polyetheretherketoneketone PEEKK, since the ether/keto ratio of 1/1 in this material permits standard processing. In comparison with the prior art material PEEK, PEEKK has the advantage that its heat resistance is about 20° C. higher.

Furthermore, comparative measurements of the elongation at break in the tensile test according to DIN 53 455 have show that the polyetherketone with the structure PEEKK has a significantly greater toughness than the polyetherketone with the formula

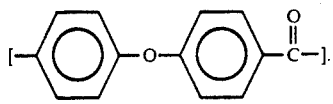  (III)

Although PEK has the same ether/keto ratio as PEEKK and consequently has very similar thermal properties, the higher absolute number of ether units per polymer unit in PEEKK brings about a higher toughness than in PEK. For instance, PEEKK gave an elongation at break according to DIN 53 455 of 28% at an extension rate of 50 mm/min, while PEK gave an elongation at break of only 7%.

The polyetherketone of the structure PEEKK therefore has properties which are substantially optimal for the processor and the user. This material has the maximum heat resistance consistent with standard processability as a thermoplastic.

The preparation of the polyetheretherketoneketone (II) which is used according to the invention can be carried out in a manner known per se, for example according to DE-B-2,220,079 or EP-B-0,143,407, by nucleophilic condensation from hydroquinone and 1,4-bis(4-chlorobenzoyl)benzene or 1,4-bis(4-fluorobenzoyl)benzene. The polyetherketone has an inherent viscosity of at least 0.5, preferably of 0.7 to 1.8, and in particular of 0.8 to 1.5.

Polyetherketones of the formula (II) can also be prepared using the Friedel-Crafts reaction by reacting diacyl halides with aromatic compounds having at least two hydrogen atoms in the presence of a catalyst (DE-A-1,645,153, U.S. Pat. Nos. 3,953,400 and 3,956,240). Suitable starting materials for the preparation of the polyetherketones using Friedel-Crafts acylation are terephthaloyl chloride or phosgene and diphenyl ether, optionally diphenoxybiphenyl, diphenoxybenzene or p-phenoxybenzoyl chloride. Polyetherketones prepared by these processes can be modified with suitable compounds to achieve the desired proportion of repeating units of the formula (II).

The composites according to the invention contain 1 to 70% by weight of reinforcing fibers, based on the composite. An amount smaller than 1% brings about no significant improvement in the properties of the material, while at a proportion of above 70% by weight the fiber component cannot be homogeneously distributed.

The reinforcing fibers, particularly the glass or carbon fibers, can be added in the form of continuous or discrete fiber strands, for example in the form of rovings or chopped fibers of generally typical dimensions. Continuous fibers are used in proportions of 30 to 65% by weight, preferably 40 to 65% by weight, and chopped fibers are generally used in proportions of 5 to 60% by weight, preferably 10 to 50% by weight.

The length of the chopped fibers must be 1 to 5 mm, preferably 2 to 5 mm.

The preparation of the composite is carried out by mixing the reinforcing fibers with the polyetherketone in suitable machines. For instance, chopped fibers or rovings can be incorporated into the polymer in an extruder. The incorporation of continuous fibers in oriented form is suitably carried out by pultrusion or by pressing polyetherketone sheets or webs with reinforcing webs or mats to form moldings directly. Other moldings can be produced by extrusion or injection molding from granules of the composite.

The composite according to the invention may contain not only reinforcing fibers but also other customary additives such as fillers, pigments, stabilizers and/or processing auxiliaries.

It is advantageous according to the invention to produce in particular thin or oblong articles, for example those having a ratio of "longest dimension in cm" to "mass in g" of greater than 3, preferably greater than 10. Moldings of this type can be used for example in automobile construction and in aerospace applications since they have for example significant weight advantages compared with metal components.

EXAMPLES

A vessel with a stirrer was charged with 7.708 kg of hydroquinone, 15.3 kg of sodium hydrogen carbonate and 70 kg of diphenyl sulfone and, after displacement of the air by nitrogen, the mixture was heated to 140° C. The batch was kept stirred at 140°-150° C. until gas evolution had subsided and then heated to 210° C. On reaching this temperature, 22.45 kg of 1,4-bis(4-fluorobenzoyl)benzene (BFB) were added and the temperature of the batch increased to 310° C. in the course of one hour. After a residence time of 20 minutes, the reaction mixture was cooled, comminuted and alternately washed with water and sulfuric acid and with acetone to remove salts and diphenyl sulfone. The polymer powder was dried in a drying oven at 120° C./100 mbar, mixed with 0.125% of triphenyl phosphite and 0.125% of triphenyl phosphate with the addition of 0.1% of polytetrafluoroethylene (PTFE) as a lubricant and extruded at 400° C.

The PEEKK obtained having a melt viscosity (MFI) according to DIN 53 735 of 15 g (400° C./10 min) was injection molded into DIN 53 457 flexural test pieces on a Krauss-Maffei injection molding machine. Cylinder temperatures from feed zone to nozzle were: 380° C., 390° C., 390° C., nozzle 395° C. The tool temperature was 200° C.

Identical test pieces were prepared from PEEKK having a proportion of 30% by weight of carbon fibers of the type ®Grafil XA-S/PES (Hysol Grafil Ltd, Coventry, England), or having 10% by weight, 20% by weight and 30% by weight of glass fibers of the type Owens Corning OCF 497 ZZ (Owens Corning Fiberglas Corp, Toledo, USA). As a comparison, test pieces were prepared based on PEEK having 30% by weight of carbon fibers and 30% by weight of glass fibers. In accordance with the 20° C.—lower melting point of PEEK, the PEEK test pieces were prepared at lower cylinder temperatures: 360° C., 370° C., 370° C, 375° C. The tool temperature was 180° C.

The table gives the measured values of the tangent modulus of elasticity according to the European Standard EN 61.

The unreinforced PEEK is the commercial product ®Victrex 450 G, the product reinforced with 30% by weight of glass fibers is Victrex 450 GL 30, and the product reinforced with 30% by weight of carbon fibers is Victrex 450 CA 30 (producer: Imperial Chemical Industries, Welwyn Garden City, England).

TABLE

| Example | Glass fiber % by weight | Carbon fiber % by weight | Material | Modulus of elasticity tangent modulus according to EN 61 |
| --- | --- | --- | --- | --- |
| 1 | — | — | PEEKK | 4,161 |
| 2 | 30 | — | PEEKK | 12,227 |
| 3 | — | 10 | PEEKK | 13,223 |
| 4 | — | 20 | PEEKK | 19,150 |
| 5 | — | 30 | PEEKK | 22,499 |
| 6 (comparison) | — | — | PEEK | 3,896 |
| 7 (comparison) | 30 | — | PEEK | 9,637 |
| 8 (comparison) | — | 30 | PEEK | 18,166 |

The results show that moldings made from composites based on PEEKK have higher moduli of elasticity than composites based on PEEK, so that moldings made from the PEEK-based materials also have higher rigidity and higher heat resistance.

We claim:

1. A fiber-reinforced, thermoplastic composite comprising (A) a polymer and (B) reinforcing fibers, said composite optionally containing (C) a filler, a pigment, a stabilizer, a processing auxiliary, or combinations thereof; the amount of reinforcing fibers being 1 to 70% by weight, based on the sum of (A) to (C), said polymer consisting essentially of a polyetheretherketoneketone consisting essentially of repeating units of the formula

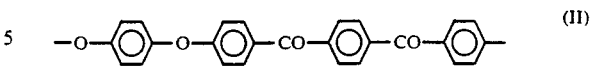

and having a melt viscosity MFI, 400° C./10 min., =2 to 250 g, an inherent viscosity of at least 0.5, and an ether/ketone ratio of at least about 2:3 but not substantially greater than about 1:1.

2. The composite as claimed in claim 1, wherein the reinforcing fibers are glass fibers or carbon fibers or a mixture thereof and are in continuous or discrete form.

3. The composite as claimed in claim 2, wherein the fibers are in the form of rovings, chopped fibers, mats or webs.

4. The composite as claimed claim 1, wherein it contains 5 to 60% by weight of chopped fibers or 30 to 65% by weight of continuous fibers.

5. The composite as claimed in claim 1, wherein the inherent viscosity of the polyetherketone is 0.8 to 1.5 and the polyetherketone has an ether/ketone ratio of 1/1.

6. The composite as claimed claim 1, wherein the reinforcing fibers are oriented.

7. A molding produced from the composite as claimed in claim 1.

8. The molding as claimed in claim 7, wherein it contains oriented continuous fibers.

9. The molding as claimed in claim 8, wherein it contains a web of continuous fibers.

* * * * *